United States Patent [19]

Tschetter et al.

[11] Patent Number: 4,535,269
[45] Date of Patent: Aug. 13, 1985

[54] INCANDESCENT LAMP

[75] Inventors: Charles D. Tschetter, Mayfield Village; Rolf S. Bergman, Cleveland Heights, both of Ohio

[73] Assignee: General Electric Company, Schenectady, N.Y.

[21] Appl. No.: 519,164

[22] Filed: Aug. 1, 1983

[51] Int. Cl.³ .......................... H01J 5/02; H01K 1/32
[52] U.S. Cl. ................................... 313/579; 313/573; 313/580; 313/255; 313/635
[58] Field of Search ............... 313/578, 579, 580, 635, 313/255, 258, 573, 634

[56] References Cited

U.S. PATENT DOCUMENTS

Re. 30,832  12/1981  La Giusa .................... 313/578 X
1,252,372   1/1918   Darrah ....................... 313/578 X

FOREIGN PATENT DOCUMENTS 8400080  1/1984  European Pat. Off. .
1463939  2/1977  United Kingdom .
2043997  2/1979  United Kingdom .
2059154  9/1979  United Kingdom .

Primary Examiner—Arthur Kellogg
Attorney, Agent, or Firm—J. P. McMahon; Philip L. Schlamp; Fred Jacob

[57] ABSTRACT

A general service incandescent lamp having a tungsten filament, an improved inner shaped bulb and a temperature resistant infrared reflective film on the outer surface of the inner bulb is disclosed. The inner bulb has an ellipsoidal shape which cooperates with the tungsten filament and infrared film to provide a highly efficient incandescent lamp.

4 Claims, 3 Drawing Figures

INCANDESCENT LAMP

CROSS REFERENCE TO RELATED APPLICATION

The present application Ser. No. 519,164 is related to U.S. patent applications Ser. Nos. 519,162, 519,165, and 519,163 of Brinn et al., Berlec, and Otto et al., respectively, filed concurrently herewith and assigned to the same assignee as the present invention. The latter two applications having issued as U.S. Pat. Nos. 4,524,302 and 4,517,491, respectively.

BACKGROUND OF THE INVENTION

The present invention relates to a general service incandescent lamp, and more particularly, to a general service incandescent lamp having a substantially elliptical inner envelope with an outer surface coated with an infrared reflective film.

The continuing pursuit of improving the efficiency of lamps is of increasing importance due to the increasing cost of energy. One of the family of lamps in which the efficiency is desired to be improved is the incandescent lamp. Incandescent lamps, although having efficiency ratings lower than those of fluorescent and high intensity discharge lamps, have many attractive features, such as, low cost, compact size, instant light, dimmability, convenience, pleasing spectral distribution and millions of existing sockets in the homes of the users who have become accustomed to incandescent lighting.

Incandescent lamps come in various sizes, the most well-known being that of the A-line which is typically termed a general service incandescent lamp and is available in a wide range of wattage ratings. Still further, the general service incandescent lamp typically has a tungsten filament.

The tungsten filament is also commonly utilized in relatively more expensive but more efficient special purpose halogen type lamps. In typical operation of the general service incandescent lamp over an extended period of time, some tungsten of the filament evaporates and becomes deposited on the wall of the outer envelope, which, typically causes a darkening of the envelope, which, decreases the lumen output thereby decreasing the lumens per watt or efficacy of the lamp. It is known that the darkening of the envelope caused by the evaporation of tungsten filament material can be substantially reduced by providing a halogen doped gas atmosphere surrounding the tungsten filament effective to provide a regenerative (transport) cycle that keeps the walls of the envelope clean and thereby the noted decrease in lumen output is eliminated or reduced.

The use of a halogen doped gas adapted to the relatively inexpensive general service incandescent lamp is described in the aforementioned U.S. application Ser. No. 519,165. The halogen atmosphere of the aforementioned U.S. application Ser. No. 519,165 is considered desirable for the present invention along with additional improvements of this invention related to the general service incandescent lamp.

The performance of a tungsten filament of the incandescent lamp can be further improved by housing the filament in a suitable fill-gas, such as xenon, krypton or argon, raised to a pressure significantly above atmospheric. The high pressure fill-gas improves the performance of the lamp by reducing the evaporation rate of the tungsten from the filament, thereby increasing the life of the filament when operated at the same temperature. Alternatively, the reduced evaporation rate of tungsten from the filament permits one to raise the filament operating temperature while maintaining the same life. Operating the filament at higher temperatures increases lumens and efficacy.

The arc-out resistance of the filament, that is, the resistance of the filament to being burned out by an arcing condition within its housing, may be improved by the addition of nitrogen. The aforementioned U.S. patent application Ser. No. 519,165 discloses an incandescent lamp utilizing the efficacy gain realized by the high pressure fill gas of the xenon, krypton or argon, and to improve the arc-out resistance of the filament by the addition of the nitrogen gas. It is considered desirable to operate the tungsten filament within the relatively high pressure fill-gas having nitrogen additive along with further improvements of the present invention.

Another means for extending the life of an incandescent lamp is to reduce the operating voltage of the filament, but it is desired that this reduction of operating voltage be accomplished while maintaining the wattage and efficacy of the lamp. The U.S. patent application Ser. No. 519,165 discloses a specially suited filament that provides extended life and maintains the wattage of the lamp. Alternatively, the efficacy of a low voltage incandescent filament can be increased while maintaining life. Further still, a low voltage filament, such as described in U.S. patent application Ser. No. 519,165, is advantageous in that the low voltage filament is mechanically sturdy with a stable configuration. It is considered desirable to provide a specially suited filament along with further improvement of this invention for a general service incandescent lamp.

Still further, means for improving the operation of the incandescent lamp may be accomplished by the utilization of an infrared film such as described in U.S. Pat. No. 4,017,758, United Kingdom (UK) Patent Specification No. 884,087, or the aforementioned U.S. application Ser. No. 519,162. It is considered desirable to provide an infrared film for an incandescent lamp arranged in accordance with the practice of this invention so that substantially all of the filament radiation is returned or reflected back to the filament by a shaped inner envelope which is a substantially ellipsoid configuration the foci of which are at the ends of the lighted portion of the filament. Further, the practice of this invention is such that the returned radiation is distributed in a nearly uniform manner along the filament. Additionally, the practice of this invention provides a shaped inner bulb having an infrared reflective coating that results in a highly improved efficacy for a general service incandescent lamp.

Still further, with regard to improving a general service incandescent lamp the shape of the surface on which the infrared film is placed should be considered with regard to the interrelationships of the dimensions and placement of the filament relative to the infrared film. For example, during the manufacturing process the location of the filament within the incandescent lamp may inadvertently vary slightly relative to the desired location of the infrared film. This slight variation may hinder the redirection of the infrared radiation by the infrared film back toward the filament so that the reflected radiation may completely miss or not intercept and impinge upon the filament. The effect of the variation between the desired and actual location of the filament relative to the infrared film increases as the distance between the filament and infrared film increases. It is therefore considered desirable to provide a shape that has on its surface an infrared film which is relatively close to the location of the filament.

Further still, if an infrared film placed on a desired surface is used in an incandescent lamp in conjunction with a halogen doped gas atmosphere, the shape of the desired surface should take into consideration the operation of that gas atmosphere. For example, the performance of a halogen doped gas atmosphere in providing its cleaning action related to a tungsten film deposited on the glass wall is dependent upon the temperature of the wall. A substantially uniform temperature distribution on the inside wall of the shaped envelope which contains the halogen doped gas is beneficial to the performance of the halogen gas. It is considered desirable to provide a predetermined shaped surface for placement of the infrared film so that the shape contributes to providing an envelope containing the halogen doped gas having a substantially uniform temperature distribution on its inside surface.

Although all of the above considerations are of primary importance to the present invention, a still further consideration is the practical consideration of providing a desired infrared film in an inexpensive manner. For example, if the IR film is placed on a relatively small device the cost of the IR film can be reduced so as to contribute to providing a relatively inexpensive incandescent lamp while still improving its efficacy.

Accordingly, objects of the present invention are to provide a relatively inexpensive general service incandescent lamp having, (1) a fill gas such as xenon, krypton, or argon all of a pressure significantly above atmospheric, both the fill-gas and the high pressure contributing to improving the operation of the filament, (2) a relatively high pressure fill-gas having an addition of nitrogen so as to improve the arc-out resistance of the filament, (3) a relatively high pressure fill-gas having an addition of halogen gas so as to provide a transport cycle for the evaporated tungsten, (4) a specially adapted filament operated at a low voltage so as to extend the life of the incandescent lamp while still maintaining the wattage of the lamp and even increasing the efficacy of the lamp, (5) a low voltage filament which is mechanically sturdy and has a stable configuration, (6) an infrared film placed onto a desired shape in which, (a) the infrared radiation reflected by the infrared film is returned to the filament so as to substantially enhance the efficacy of the lamp, (b) the placement of the infrared film on the desired surface reduces the effect of variations between the desired and actual locations of the filament relative to the infrared film, (c) the desired shape having the infrared film provides a substantially uniform temperature distribution for housing the halogen gas so as to enhance the operation of the halogen gas atmosphere, and (d) the infrared film is provided for the incandescent lamp in a relatively inexpensive manner, and (7) combining all the six objective features of this invention in such a manner that the overall effects thereof extend the life of the incandescent lamp and provide an improved efficacy both greater than the expected gains usually realized from the individual six features of this invention.

These and other objects of the invention will become apparent upon consideration of the following description taken together with the accompanying drawing.

SUMMARY OF THE INVENTION

The present invention is directed to a general service incandescent lamp having improved efficacy. The improved general service incandescent lamp comprises an outer envelope and an inner envelope having a substantially ellipsoidal configuration and containing a halogen atmosphere along with a high pressure fill-gas. The inner envelope further has an IR reflective film covering its outer surface.

In accordance with one embodiment of the present invention the efficacy improved general service incandescent lamp disclosed comprises: (a) a housing having an electrically conductive base; (b) an outer envelope attached to the housing; (c) an inner envelope having a surface of revolution which is substantially ellipsoidal with related foci. The inner envelope is spatially disposed within the outer envelope and contains halogen gas along with a fill-gas of a pressure significantly above atmospheric. The inner envelope further has an IR film covering its ellipsoidally shaped outer surface, and; a filament specially adapted to be effectively energizable for normal operating wattage rating at standard 120 volt A.C. as well as at a reduced voltage relative to a typical household power source and is spatially disposed within the inner envelope so as to be located longitudinally along the major axis of the ellipsoidally shaped inner envelope. The filament is positioned within the inner envelope on the major axis thereof and so that its lighted portion fully occupies the distance between the foci of the ellipsoidally shaped inner envelope. During the operation of the lamp the IR film substantially transmits visible radiation and substantially reflects infrared radiation emitted by the filament back toward the filament. The film is capable of maintaining effective transmission and reflectance for temperatures approaching the softening point of the material of the inner envelope.

DETAILED DESCRIPTION

Figure 1:
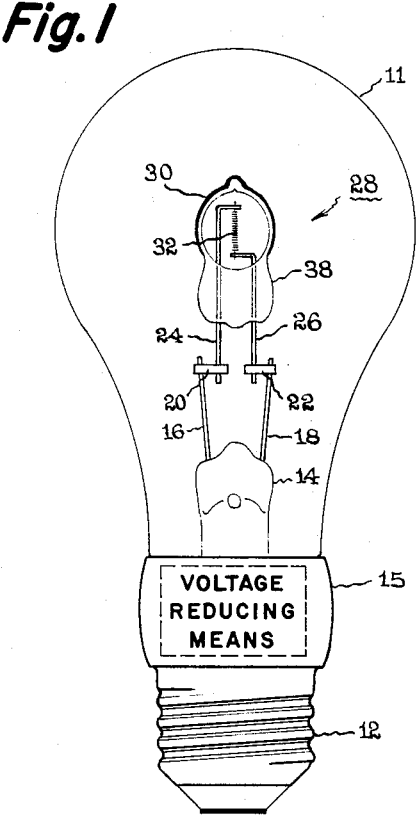
FIG. 1 shows an improved general service incandescent lamp in accordance with one embodiment of the present invention.

FIG. 1 shows an improved general service incandescent lamp 10 in accordance with one embodiment of the present invention. The lamp 10 comprises an outer envelope 11 which is attached to a housing 15 having an electrically conductive base 12. The outer envelope 11 may be filled with an inert gas such as nitrogen at a pressure of 400 torr or it may be evacuated. The outer envelope 11 is formed of a light-transmissive material, and may have a shape typically known as A-line.

FIG. 1 further shows the lamp 10 as comprising an inner envelope 28 which contains a halogen gas and fill-gas of a pressure significantly above atmospheric. The fill-gas may be selected from the group consisting of xenon, krypton, argon and mixtures of these gases with nitrogen. The halogen gas, along with xenon, krypton, argon and nitrogen gases and their related mixtures may be those gases described in the previously mentioned U.S. patent application Ser. No. 519,165 to which reference may be made for further details of the gases contained within the inner envelope 28.

The inner envelope 28 has spatially disposed therein in a longitudinal manner along its major axis, a tungsten filament 32. The filament 32 may be of a coiled-coil type and have a length in the range of approximately 0.1 to approximately 1.0 inches and preferably fully occupies the distance between the foci of the ellipsoid. The filament 32 is preferably of a low voltage type but the practice of this invention also contemplates a filament operated at the conventional 120 volts. The preferred filament 32 is a low voltage filament which may be specially adapted to be effectively energizable for normal operating wattage rating at a reduced voltage relative to a typical household power source and may be of the type described in U.S. patent application Ser. No. 519,165 to which reference may be made for further details.

The reduced voltage is of either an A.C. type or a D.C. type and is applied across the filament 32. The reduced voltage is developed by an external means (not shown) that may be located in the housing 15 of the lamp 10 of FIG. 1. The details of the external means are not considered part of the present invention. An external means such as a voltage converter need only supply a reduced A.C. or D.C. voltage relative to the A.C. power source, such as a typical household power source, to values such as given in the U.S. patent application Ser. No. 519,165. For details of suitable voltage reducing means, reference may be made to the above-mentioned U.S. patent application Ser. No. 519,162 of Brinn et al.

The improved general service incandescent lamp 10 of FIG. 1 has two electrically conductive support members 16 and 18 which are rigidly disposed within the outer envelope 11 by a stem 14. One end of each of the support members 16 and 18 extends through the stem 14 and makes electrical connection with appropriate electrical contact portions of the housing 15 which are connected to the metallic base 12. The other ends of the support members 16 and 18 are connected to inleads 24 and 26 of the inner envelope 28 by electrically conductive cross support members 20 and 22, respectively.

The inner envelope 28 of FIG. 1 is "single-ended" but can also be "double-ended." The inner envelope 28, except for its desired shape to be further described hereinafter, can be either of those described in the U.S. patent application Ser. No. 519,165. Similarly, the inner envelope 28 can be formed of quartz or glass tubing having some of the desired dimensions described in U.S. patent application Ser. No. 519,165 to which reference may be made.

Figure 2:
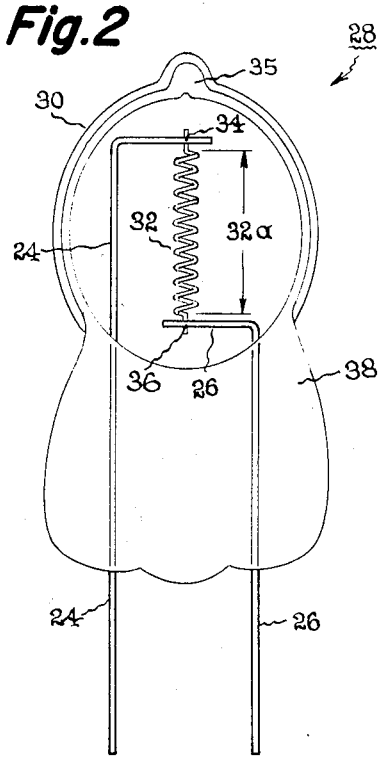
FIG. 2 is an enlarged illustration of the inner envelope of FIG. 1.

The inner envelope 28 of the lamp 10 of FIG. 1 is shown more clearly in an enlarged manner in FIG. 2. The inner envelope 28 is shown in FIG. 2 as having a pinch 38 at its lower end. FIG. 2 shows the filament 32 connected to inleads 24 and 26 by clamping at locations 34 and 36, respectively. FIG. 2 further shows the filament 32 which preferably has a coiled-coil portion 32a. The inner envelope 28 has a substantially ellipsoidal shape except that its shape is partly disturbed or distorted, relative to its desired optical characteristics, near the point of sealing shown as a chamber 35 and also along the perimeter of the inner envelope 28 near the pinch 38. The desired ellipsoidal shape of the inner envelope 28 is to be described hereinafter with regard to FIG. 3. The inner envelope 28 bears an infrared reflective film 30 located on the outer surface thereof as seen in FIG. 2.

In general, the infrared (IR) film 30 primarily in cooperation with the desired ellipsoidal shape of the inner envelope 28 and in cooperation with the desired positioning of the filament within the inner envelope 28 performs four (4) desirable functions, (1) film 30 reflects the infrared radiation emitted by the filament 32 back onto the filament 32 which reduces the power delivered to the filament via the electrical connections thereby improving the efficacy of the filament 32 and the lamp 10 of FIG. 1; (2) the film 30 allows the visible radiation emitted by the filament 32 to pass through inner envelope 28 and to be transmitted as visible radiation; (3) the desired ellipsoidal shape of the inner envelope 28 having film 30 on its outer surface is effective such that substantially all of the filament radiation reflected by the infrared film is directed back toward the filament; and (4) the desired ellipsoidal shape of the inner envelope 28 having film 30 on its outer surface provides a desired temperature distribution along the inner walls of the inner envelope 28, which provides a desired environment for the halogen gas.

It is desired that the IR film 30 have optical and temperature properties similar to a reflecting filter disclosed in U.S. Pat. No. 4,229,066, issued Oct. 21, 1980, wherein is described a tantalum pentoxide $Ta_2O_5$ and fused silica $SiO_2$ filter. The infrared film 30 is a composite or is constituted of a plurality of stacked layers such as twenty-nine (29) comprised of both a high refractive index material such as tantalum pentoxide and a low refractive index material such as silicon dioxide $SiO_2$. It is desired that the film 30 having desired transmittance and reflectance characteristics be capable of withstanding and operating effectively at a temperature of 600° C. for a prolonged period of time such as 2000 hours. The 600° C. operating temperature is related to the softening point of the material of the inner envelope 28.

Figure 3:
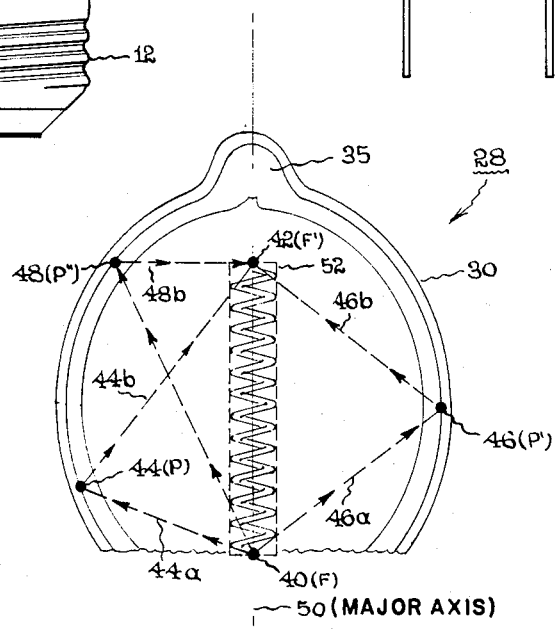
FIG. 3 shows the ellipsoidal shape of the inner envelope and the placement of the filament along the major axis of the ellipsoid.

The ellipsoidal shape of the inner envelope 28 is of substantial importance to the improved general service incandescent lamp 10 of this invention and reference is now made to FIG. 3 for a detailed description of the desired shape of the inner envelope 28.

FIG. 3 is similar to the previously discussed FIG. 2 except that FIG. 3 does not show the pinch 38, inleads 24 and 26, nor the clamping locations 34 and 36. FIG. 3 shows the inner envelope 28 as having a nearly or substantially elliptical shape. FIG. 3 further shows the filament 32 centrally positioned along the major axis 50 in an axial manner and occupying fully the distance between the foci of the substantially ellipsoidal envelope. The filament 32 being of a low voltage type provides a relatively compact light source. It is of substantial importance to the practice of this invention that in the operation of the lamp 10 the lighted portion of the filament 32 is the length between the foci. The foci are shown in FIG. 3 as 40(F) and 42(F'). From FIG. 3 it should be noted that the foci 40(F) and 42(F') are located close to the ends of the coiled-coil portion 32a (shown in FIG. 2) of filament 32. Further, from FIG. 3 it should be noted that the confines of the filament is represented by a cylinder 52 shown in phantom. It should also be noted that the points 44(P), 46(P'), and 48(P") shown in FIG. 3 represent points related to the ellipsoidal shape or curve of the inner envelope 28. Points 44(P'), 46(P') and 48(P") are shown in FIG. 3 as related to rays 44a and 44b, 46a and 46b, and 48a and 48b, respectively, shown in phantom and having arrows. The paths of the rays 44a, 44b, 46a, 46b, 48a and 48b shown in FIG. 3 are indicated to show that the radiation emitted by the lighted filament 32 between foci 40(F) and 42(F') and which is reflected by film 30 is desirably directed toward and impinges upon the filament cylinder 52. Still further, although not shown in FIG. 3 it is desired that any variation from the fixed location of the filament 32 relative to the placement of the IR film 30 does not exceed a distance of approximately 1 cm. This is important with regard to the optical consideration, commonly known as the optical lever, of the IR film 30 redirecting the infrared radiation back to the filament 32. The placement of the IR film 30 on a relatively small inner envelope 28 located in close proximity to the lighted filament 32 is advantageous to the redirection of the infrared radiation emitted by lighted filament 32 when compared to the placement of film 30 on a relatively large envelope, such as outer envelope 11, located relatively remote from the lighted filament 32.

The nearly ellipsoidal shape of the inner envelope 28 along with the predetermined location of the lighted filament 32 relative to the IR film 30 is effective such that almost all of the infrared radiation emitted by the lighted filament 32 and which is reflected from the film on the walls of the inner envelope 28 reach the filament cylinder 52 of FIG. 3. The amount of infrared radiation reaching the filament cylinder 52 is determined, in part, by the reflectance of the film 30. If the shape of the inner envelope 28 was truly or precisely an ellipsoidal and if the IR film 40 reflected all the infrared impinging on its surface, then 100% of the reflected infrared radiation would reach the filament cylinder 52. However, as previously discussed the shape of the inner envelope 28 is not truly an ellipse because of the distribution of the pinch 38 and chamber 35, discussed with regard to FIG. 2, and also the IR film does not have a 100% infrared radiation reflectance characteristic both contributing to the prevention of obtaining 100% of the infrared radiation from reaching the filament cylinder 52. The amount of radiation actually absorbed by the filament is further reduced since much of the returning radiation is not absorbed by the tungsten wire.

In accordance with the practice of this invention, improved incandescent lamps were fabricated. The lamps that were made had twelve layer IR films on the inner envelope 28. The film 30 consisted of twelve (12) alternating layers of materials whose indices of refraction were 2.0 and 1.45. The inner envelopes 28 had ellipsoidal shapes whose major axis was 17.6 mm long and whose minor axis was 14.5 mm long. The filaments 32 in these lamps were only 5 mm long, rather than the desired 10 mm long determined by the desired foci separation of the inner fabricated envelopes 28. A comparison of the performance of lamps having the desired features of this invention against similar lamps not having the advantages of the present was accomplished. The efficacy gain achieved with the lamp of the present invention was 15%.

Further in accordance with the practice of this invention, by using computer modelling it has been estimated that if the desired 10 mm filament length were incorporated into the same inner envelopes desired for the fabricated lamp and if an IR film having reflective and transmission characteristics similar to those described in the aforementioned U.S. Pat. No. 4,229,066 were used, then the efficacy gain would be between 25 and 35%.

Furthermore, the practice of this invention provides a temperature distribution along the inner walls of the inner envelope 28 which enhances the performance of the halogen gas, discussed in the "Background," in its maintenance of clean bulb walls of inner envelope 28. If possible, a theoretically uniform temperature distribution along the inner walls of the inner envelope 28 would provide an environment in which the halogen gas would perform in its most desired manner. While a truly uniform distribution of temperature along the inner walls of the inner envelope 28 is not practically achievable, the practice of this invention recognizes the need for a desired temperature distribution for the halogen gas and provides such for the enhancement of the halogen gas performance.

It should now be appreciated that the practice of this invention provides the incandescent lamp art with an improved general service incandescent lamp with an inner envelope having (1) high pressure fill gas, a nitrogen gas additive for arc-resistance improvement, both improving the performance of the filament, (2) a low voltage filament serving as a relatively compact light source and when operated functions as the length between the foci of the ellipsoidal shape of the inner envelope, (3) ellipsoidal shaped inner envelope having an infrared film on its outer surfaces in which the ellipsoidal shape primarily provides infrared radiation reflected by infrared film to advantageously create an environment along the inner walls of the inner envelope which enhances the performance of the halogen gas within the inner envelope with regard to providing a desired cleaning function of the walls of the inner envelope, (4) an ellipsoidal shaped inner envelope having an infrared film on its outer surface located relative to the compact lighted filament so that a major portion of the infrared radiation emitted by the lighted filament is reflected and directed back toward the filament so that the infrared radiation impingement along the filament improves the efficacy of the lamp, and (5) a nearly ellipsoidal shaped inner envelope having an infrared film on its outer surface and containing a halogen gas, a relatively high pressure fill-gas, and a nitrogen gas all advantageously contributing to an improved efficiency with the expected total efficiency gain being greater than the expected gains usually realized from the individual contributors.

What we claim as new and desire to secure by Letters Patent of the United States is:

1. An efficacy improved general service incandescent lamp comprising:
    (a) a housing having an electrically conductive base;
    (b) an outer envelope attached to said housing;
    (c) an inner envelope having an outer surface of revolution which is substantially ellipsoidal with internally located related foci, said inner envelope being spatially supported within said outer envelope, containing a halogen gas along with a fill-gas at a pressure significantly above atmospheric, and having an IR reflective film covering the substantially ellipsoidal outer surface thereof,
    (d) a filament adapted to be effectively energizable for normal operating wattage rating at a reduced voltage relative to a typical household power source, said filament being spatially predetermined within said inner envelope, located longitudinally along the major axis of the inner envelope, and its lighted length fully occupying the distance between the foci of the inner envelope;

whereby during the operation of said lamp said film substantially transmits visible radiation and substantially reflects toward said filament infrared radiation emitted by said filament, said film being capable of such transmission and reflection for temperatures approaching the softening point of the material of the inner envelope.

2. An efficacy improved general service incandescent lamp according to claim 1 wherein said filament is adapted to be energized by a typical household power source.

3. An efficacy improved general service incandescent lamp according to claim 1 wherein said inner envelope has a major axis with a length of about 17.6 mm and a minor axis with a length of about 14.5 mm, and said filament has a lighted length of about 5 mm.

4. An efficacy improved general service incandescent lamp according to claim 1 wherein said inner envelope has a major axis with a length of about 17.6 mm and a minor axis with a length of about 14.5 mm, and said filament has a lighted length of about 10 mm.

* * * * *